United States Patent
Park et al.

(10) Patent No.: US 11,462,964 B2
(45) Date of Patent: Oct. 4, 2022

(54) MOTOR AND BRAKE DEVICE COMPRISING SAME

(71) Applicant: LG INNOTEK CO., LTD., Seoul (KR)

(72) Inventors: Kyung Sang Park, Seoul (KR); Seong Jin Kim, Seoul (KR); Chang Hyun Park, Seoul (KR)

(73) Assignees: LG INNOTEK CO., LTD., Seoul (KR); Mando Corporation, Pyeongtaek-si (KR)

( * ) Notice: Subject to any disclaimer, the term of this patent is extended or adjusted under 35 U.S.C. 154(b) by 247 days.

(21) Appl. No.: 15/765,161

(22) PCT Filed: Sep. 28, 2016

(86) PCT No.: PCT/KR2016/010837
§ 371 (c)(1),
(2) Date: Mar. 30, 2018

(87) PCT Pub. No.: WO2017/057896
PCT Pub. Date: Apr. 6, 2017

(65) Prior Publication Data
US 2018/0278114 A1    Sep. 27, 2018

(30) Foreign Application Priority Data

Sep. 30, 2015   (KR) .................. 10-2015-0137810
Feb. 2, 2016    (KR) .................. 10-2016-0013091

(51) Int. Cl.
*H02K 5/10*    (2006.01)
*H02K 5/22*    (2006.01)
(Continued)

(52) U.S. Cl.
CPC ............... *H02K 5/10* (2013.01); *H02K 5/22* (2013.01); *H02K 5/225* (2013.01); *H02K 7/1166* (2013.01);
(Continued)

(58) Field of Classification Search
CPC .......... H02K 5/22; H02K 5/225; H02K 7/116; H02K 7/1163; H02K 7/1166;
(Continued)

(56) References Cited

U.S. PATENT DOCUMENTS 3,308,316 A * 3/1967 Pfahl .................... H01B 17/306
                                                      310/87
5,056,213 A * 10/1991 Behnke ................ H02K 7/1166
                                                       29/596
(Continued)

FOREIGN PATENT DOCUMENTS

EP    2 852 033 A1    3/2015
EP    3 337 015 A1    6/2018
(Continued)

OTHER PUBLICATIONS

Yoneda et al., Machine Translation of JP2010047238, dated Mar. 2010 (Year: 2010).*
(Continued)

*Primary Examiner* — Quyen P Leung
*Assistant Examiner* — Eric Johnson
(74) *Attorney, Agent, or Firm* — Saliwanchik, Lloyd & Eisenschenk

(57) ABSTRACT

The present invention provides a motor including: a rotating shaft; a rotor including a hole in which the rotating shaft is disposed; a stator disposed at an outside of the rotor; a housing configured to accommodate the rotor and the stator; and a sealing guide disposed to cover an opening formed in one side of the housing, wherein the sealing guide supports a terminal of the stator exposed at an outside of the housing.

26 Claims, 13 Drawing Sheets

(51) Int. Cl.
| | |
|---|---|
| *H02K 7/116* | (2006.01) |
| *H02K 5/173* | (2006.01) |
| *B60T 13/74* | (2006.01) |
| *F16H 57/039* | (2012.01) |
| *F16H 57/02* | (2012.01) |
| *H02K 7/08* | (2006.01) |
| *H02K 7/102* | (2006.01) |

(52) U.S. Cl.
CPC ....... *B60T 13/745* (2013.01); *B60T 2270/306* (2013.01); *F16H 57/039* (2013.01); *F16H 2057/02034* (2013.01); *H02K 5/1732* (2013.01); *H02K 7/083* (2013.01); *H02K 7/102* (2013.01); *H02K 2203/09* (2013.01)

(58) Field of Classification Search
CPC .... H02K 2203/09; H02K 11/30; H02K 11/33; B60T 13/74; B60T 13/745; F16H 57/039
See application file for complete search history.

(56) References Cited

U.S. PATENT DOCUMENTS

| | | | | |
|---|---|---|---|---|
| 5,954,178 | A * | 9/1999 | Fischer | F16D 28/00 192/90 |
| 7,360,467 | B2 * | 4/2008 | Segawa | B62D 5/0409 180/444 |
| 2002/0175574 | A1 * | 11/2002 | Okazaki | H02K 5/225 310/68 B |
| 2004/0065163 | A1 * | 4/2004 | Takahashi | H02K 7/1166 74/388 PS |
| 2004/0070267 | A1 * | 4/2004 | Volz | H02K 11/33 188/157 |
| 2005/0073204 | A1 * | 4/2005 | Puterbaugh | H02K 5/10 310/89 |
| 2008/0229740 | A1 * | 9/2008 | Ikeda | B60T 13/746 60/545 |
| 2009/0322169 | A1 * | 12/2009 | Moody | H02K 5/10 310/89 |
| 2015/0108859 | A1 * | 4/2015 | Nakazumi | H02K 3/32 310/71 |

FOREIGN PATENT DOCUMENTS

| | | |
|---|---|---|
| JP | 2010-047238 A | 3/2010 |
| JP | 2011-073535 A | 4/2011 |
| JP | 2011-245977 A | 12/2011 |
| KR | 10-2010-0030010 A | 3/2010 |
| KR | 10-2013-0087198 A | 8/2013 |
| KR | 10-2013-0126142 A | 11/2013 |
| KR | 10-2013-0141072 A | 12/2013 |
| WO | WO-2017047969 A1 * | 3/2017 ............. H02K 5/225 |

OTHER PUBLICATIONS

Supplementary Partial European Search Report dated Jul. 26, 2018 in European Application No. 16852042.7.
International Search Report in International Application No. PCT/KR2016/010837, filed Sep. 28, 2016.

* cited by examiner

MOTOR AND BRAKE DEVICE COMPRISING SAME

CROSS-REFERENCE TO RELATED APPLICATIONS

This application is the U.S. national stage application of International Patent Application No. PCT/KR2016/010837, filed Sep. 28, 2016, which claims priority to Korean Application Nos. 10-2015-0137810, filed Sep. 30, 2015; and 10-2016-0013091, filed Feb. 2, 2016, the disclosures of each of which are incorporated herein by reference in their entirety.

TECHNICAL FIELD

The present invention relates to a motor and a brake system including the same.

BACKGROUND ART

Generally, it is convenient to use an electronic parking brake (EPB) configured to use a motor operated by a switch because a hand brake is not used.

Referring to FIG. 1, an EPB system 2 may include a vacuum booster 3 having a motor and a master cylinder, an electronic stability control (ESC) system 4, a vacuum pump 5, a cylinder and a pedal simulator for generating foot power of a driver, a solenoid valve for opening and closing a flow path, an electronic control unit (ECU) for controlling a pedal stroke sensor and the motor, and the like. Here, a drawing numeral 6 denotes a reservoir.

Here, the booster is a device configured to increase the foot power of the driver which is transmitted to the master cylinder from a brake pedal.

In addition, as a stability reinforcing device of a vehicle, an ESC system may serve to generate a braking force of a wheel.

However, since the vacuum booster 3, the ESC system 4, the vacuum pump 5, and the like are separately provided and used to form the EPB system 2, there is a problem in that reduction in size and weight of the EPB system 2 is difficult. Particularly, each of the vacuum booster 3, the ESC system 4, and the vacuum pump 5 may include a motor, the reduction in size and weight of the EPB system 2 are more difficult.

In addition, in the case of a hybrid electric vehicle or electric vehicle, there is a problem in that vacuum of an engine may not be used.

DISCLOSURE

Technical Problem

The present invention is directed to providing a brake device capable of braking a vehicle without a vacuum pump and reducing a size and weight thereof.

The present invention also is directed to providing a motor having a side at which a gear is installable to reduce a size and weight of a brake device.

The present invention also is directed to providing a motor capable of inhibiting a twist of a terminal using a grommet to minimize an assembly failure rate of a connector connected to the terminal.

Technical Solution

One aspect of the present invention provides a motor including a rotating shaft, a rotor including a hole in which the rotating shaft is disposed, a stator disposed at an outer side of the rotor, a housing configured to accommodate the rotor and the stator, and a sealing guide disposed to cover an opening formed in one side of the housing, wherein the sealing guide supports a terminal of the stator exposed at an outside of the housing.

The sealing guide may include a grommet supporting an upper end of the terminal exposed at the outside and a sealing cap disposed to cover an opening formed in an upper side of the housing, and the grommet may be fixed to the housing by a fixing member.

The grommet may include a through hole formed such that the upper end of the terminal passes through the through hole and is coupled to the grommet.

The sealing guide may include a grommet supporting an upper end of the terminal exposed at the outside and a sealing cap disposed to cover an opening formed in an upper side of the housing, wherein the grommet and the sealing cap may be integrally formed.

The grommet may include a through hole through which the upper end of the terminal passes.

The stator may include a stator body, a terminal including an upper end disposed to be exposed at the outside of the housing, a bus bar interposed between the stator body and the terminal, and a conductive medium electrically connecting an end portion of a coil of the stator body and the terminal.

The conductive medium may be formed to be flexible.

The terminal may be formed in a bar type.

The housing may include a first accommodation groove in which the stator and the rotor are disposed, a second accommodation groove connected to the first accommodation groove, and a third accommodation groove connected to the second accommodation groove.

The second accommodation groove may include a rotating shaft accommodation groove in which the rotating shaft is disposed, and a terminal accommodation groove in which the terminal is disposed.

When the rotating shaft is disposed in the rotating shaft accommodation groove, the rotating shaft accommodation groove may guide the rotating shaft.

The stator may further include a terminal cover disposed to cover the terminal, and when the terminal is disposed in the terminal accommodation groove, the terminal accommodation groove may guide the terminal at which the terminal cover is disposed.

The first accommodation groove and the third accommodation groove may be disposed perpendicular to each other with respect to the rotating shaft accommodation groove.

The motor may further include a first through hole formed in a support surface of the first accommodation groove and configured to connect the first accommodation groove and the rotating shaft accommodation groove, and a second through hole formed in a side surface of the third accommodation groove and configured to connect the second accommodation groove and the third accommodation groove.

A gear may be disposed in the third accommodation groove.

The gear may be coupled to a thread formed on the rotating shaft and rotated by rotation of the rotating shaft.

A gear shaft of the gear and the rotating shaft may be disposed to be perpendicular to and spaced apart from each other.

A sealing cap of the sealing guide may be press-fitted and installed in an opening formed in an upper side of the rotating shaft accommodation groove.

A grommet of the sealing guide may be disposed at an opening formed in an upper side of the terminal accommodation groove.

The motor may further include a bearing installed in the opening and configured to support the rotating shaft.

The motor may further include a fixing member installed in the opening, interposed between the sealing guide and the bearing, and configured to fix the bearing.

The fixing member may include a first fixing ring press-fitted at the opening and configured to be in contact with an upper surface of the bearing.

The fixing member may include a second fixing ring press-fitted at the shaft and configured to be in contact with the upper surface of the bearing.

The first fixing ring may be in contact with an upper surface of an outer wheel of the bearing, and the second fixing ring may be in contact with an upper surface of an inner wheel of the bearing.

The motor may further include a motor cover disposed to cover an opening formed in the other side of the housing.

The motor cover may include a coupling portion formed at an edge of the motor cover and coupled to the housing.

Another aspect of the present invention provides a brake device including a motor, a master cylinder operated by driving the motor, and an electronic stability control (ESC) system, wherein the motor includes a rotating shaft, a rotor including a hole in which the rotating shaft is disposed, a stator disposed at an outer side of the rotor, a housing configured to accommodate the rotor and the stator, and a sealing guide disposed to cover an opening formed in one side of the housing, and the sealing guide supports a terminal of the stator exposed at an outside of the housing.

Advantageous Effects

As described above, since a motor having a configuration according to the embodiment includes an integrated housing in which a gear connected to one side of a rotor can be disposed unlike the conventional brake devices in which a gear and a motor are separately provided, the motor can be sealed without a separate sealing member.

In addition, an opening of the housing can be covered and sealed using a sealing guide, and a terminal of a stator can also be supported.

In addition, the motor can inhibit a twist of the terminal using a grommet of the sealing guide, and accordingly, an assembly failure rate of a connector connected to the terminal can be minimized.

In addition, a weight of the grommet of the sealing guide can be applied only in a longitudinal direction of the terminal. In addition, since the weight applied in the longitudinal direction of the terminal is dispersed or removed by a conductive medium, damage can be inhibited after fusing.

In addition, since the grommet and a sealing cap of the sealing guide can be integrally formed, the number of assembly processes can be reduced.

In addition, since a fixing member supports a bearing in an axial direction, a support force against a weight in the axial direction can increase, and separation of the bearing can be inhibited.

MODES OF THE INVENTION

Figure 1:
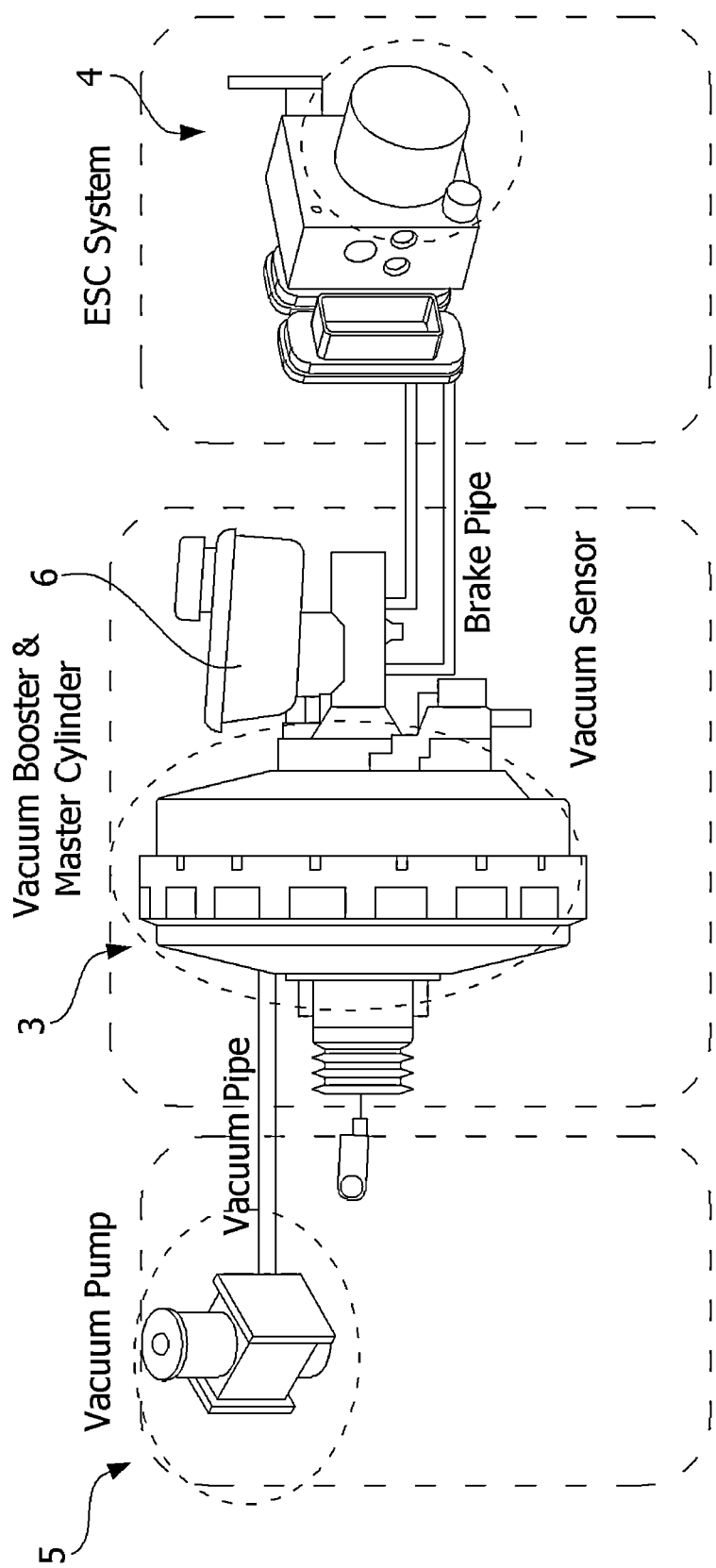
FIG. 1 is a view illustrating a conventional brake system.

While the present invention may be modified in various ways and take on various alternative forms, specific embodiments thereof are shown in the accompanying drawings and described in detail below as examples. However, there is no intent to limit the present invention to the particular forms disclosed. On the contrary, the present invention is to cover all modifications, equivalents, and alternatives falling within the spirit and scope of the appended claims.

It should be understood that, although terms "first," "second," and the like may be used herein to describe various elements, the elements are not limited by the terms. The terms are only used to distinguish one element from another. For example, a first element could be termed a second element, and similarly, a second element could be termed a first element without departing from the scope of the present invention. As used herein, the term "and/or" includes any and all combinations of one or more of the associated listed items.

It should be understood that, when an element is referred to as being "connected" or "coupled" to another element, the element can be directly connected or coupled to another element or intervening elements may be present. Conversely, when an element is referred to as being "directly connected" or "directly coupled" to another element, there are no intervening elements.

In the description of embodiments, when an element is referred to as being "on or under" another element, the term "on or under" refers to either a direct connection between two elements or an indirect connection between two elements having one or more elements formed therebetween. In addition, when the term "on or under" is used, it may refer to a downward direction as well as an upward direction with respect to an element.

Terms used in the present specification are merely used to describe exemplary embodiments, and are not intended to limit the embodiments. An expression used in the singular encompasses the expression of the plural, unless it has a clearly different meaning in the context. In the present specification, it should be understood that the terms such as "including," "having," and "comprising" are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or be added.

Unless otherwise defined, all terms including technical and scientific terms used herein have the same meaning generally understood by a person of ordinary skill in the art to which this invention belongs. It should be further understood that terms defined in generally used dictionaries are interpreted as including meanings identical to contextual meanings of the relevant art and not in an idealized or overly formal sense unless expressly so defined herein.

Hereinafter, embodiments will be illustrated in detail with reference to the accompanying drawings, and components that are the same or correspond to each other regardless of reference numerals will be referred to by the same or similar reference numerals, and redundant descriptions thereof will be omitted.

Referring to FIGS. 2 to 8, a motor 1 according to an embodiment includes a housing integrally formed with a gear 10 installed at one side of the housing, and therefore, a configuration related to sealing may be minimized.

Figure 2:
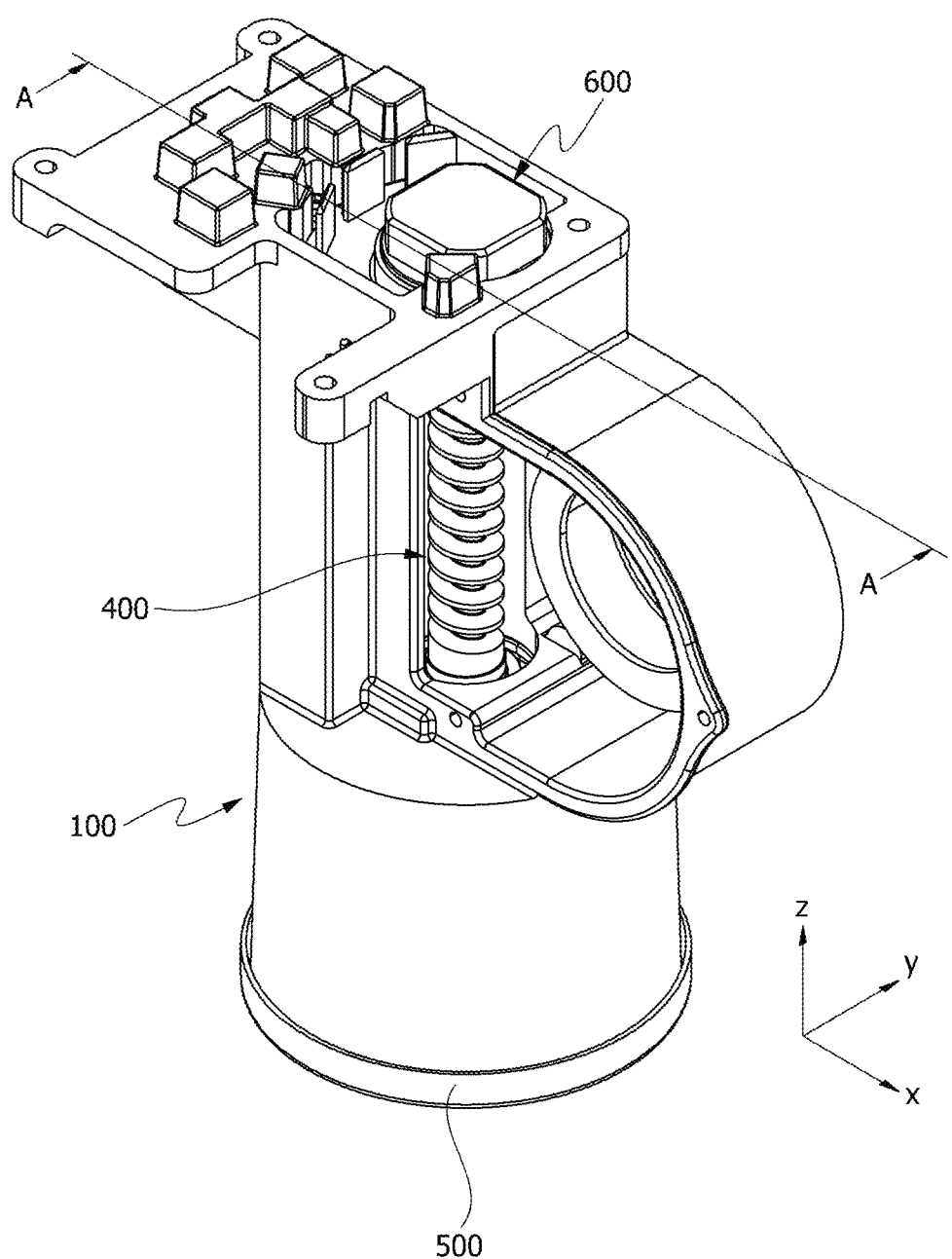
FIG. 2 is a perspective view illustrating a motor according to an embodiment.

Although an upper side and a lower side are clearly divided by a Z-axis illustrated in FIG. 2 to describe the motor 1, a direction of the motor 1 is not necessary limited by the upper side and the lower side.

The motor 1 may include a housing 100 in which openings are formed at one side (upper side) and the other side (lower side) of the housing 100, a stator 200 disposed in the housing 100, a rotor 300 disposed in the housing 100 to be rotatable with respect to the stator 200, a rotating shaft 400 configured to rotate with the rotor 300, a motor cover 500 coupled to the lower side of the housing 100, a sealing guide 600 or 600a coupled to an upper side of the housing 100, and a sensor magnet assembly 700. Here, the stator 200 may include a terminal 220, and an upper end of the terminal 220 may be exposed at the outside of the housing 100.

The housing 100 may include a first accommodation groove 110 in which the stator 200 and the rotor 300 are disposed, a second accommodation groove 120 which is formed to communicate with the first accommodation groove 110 and in which one end of the rotating shaft 400 is disposed, and a third accommodation groove 130 disposed to be connected to the second accommodation groove 120. Here, the second accommodation groove 120 may include a rotating shaft accommodation groove 120a in which the rotating shaft 400 is disposed and a terminal accommodation groove 120b in which the terminal 220 is disposed.

An opening 111 may be formed at one side of the first accommodation groove 110. That is, the opening 111 may be formed at a lower side of the first accommodation groove 110, and the stator 200, the rotor 300, and the rotating shaft 400 may be inserted through the opening 111. Here, the first accommodation groove 110 may be formed in a cylindrical shape having a size suitable for inserting and positioning the stator 200.

In addition, as a first through hole 113 is formed in a support surface 112 formed at one side of the first accommodation groove 110, the first accommodation groove 110 may communicate with the second accommodation groove 120. Accordingly, one end of the rotating shaft 400 inserted into the first accommodation groove 110 may pass through the first accommodation groove 110 and be disposed in the rotating shaft accommodation groove 120a of the second accommodation groove 120 through the first through hole 113.

One end of the rotating shaft 400 inserted through the first accommodation groove 110 may be disposed in the rotating shaft accommodation groove 120a. Here, a diameter of the rotating shaft accommodation groove 120a may be less than that of the first accommodation groove 110.

Accordingly, when the rotating shaft 400 is disposed in the rotating shaft accommodation groove 120a, the rotating shaft accommodation groove 120a may guide insertion and installation of the rotating shaft 400.

The terminal 220 of the stator 200 inserted through the first accommodation groove 110 may be disposed in the terminal accommodation groove 120b. Here, a width of the terminal accommodation groove 120b may be less than a diameter of the first accommodation groove 110.

In addition, the width of the terminal accommodation groove 120b may be defined in consideration of a width of a terminal cover 250 disposed to cover the terminal 220.

Accordingly, when the terminal 220 is disposed in the terminal accommodation groove 120b, the terminal accommodation groove 120b may guide insertion and installation of the terminal 220 at which the terminal cover 250 is disposed.

The gear 10 may be disposed in the third accommodation groove 130. Here, the gear 10 may include a gear body 11 and a gear shaft 12.

An extension direction (Z-direction) of the first accommodation groove 110 may be perpendicular to an extension direction (X-direction) of the third accommodation groove 130 with respect to the rotating shaft accommodation groove 120a. That is, the first accommodation groove 110 may be disposed perpendicular to the third accommodation groove 130 with respect to the rotating shaft accommodation groove 120a. Accordingly, the rotating shaft 400 disposed in the rotating shaft accommodation groove 120a and the gear shaft 12 of the gear 10 disposed in the third accommodation groove 130 may be disposed to be spaced apart from each other by the gear body 11 interposed between the gear shaft 12 and the rotating shaft 400, and may also be disposed perpendicular to each other.

The third accommodation groove 130 may be connected to the rotating shaft accommodation groove 120a to communicate with each other. For example, since the housing 100 may include a second through hole 131 formed between the rotating shaft accommodation groove 120a and the third accommodation groove 130, the third accommodation groove 130 may be connected to and communicate with the rotating shaft accommodation groove 120a through the second through hole 131.

Meanwhile, the housing 100 may be one part in which the first accommodation groove 110, the second accommodation groove 120, and the third accommodation groove 130 are formed. The housing 100 may be made by a forming method such as an injection molding method.

Accordingly, since the housing 100 of the motor 1 is one part in which all of the first accommodation groove 110, the second accommodation groove 120, and the third accommodation groove 130 are formed, a structure of the housing 100 may be simplified, and manufacturing thereof may be easy.

In addition, since the motor 1 includes the third accommodation groove 130 integrally formed with the gear 10 installed at one side of the motor 1, a configuration related to sealing is minimized, and reduction in a size thereof may be realized because an additional gearbox is not necessary.

The stator 200 may have a known form in which a coil is wound around a stator core. In the stator 200, a coil may be wound around an integrated stator core, or a coil may be wound around a plurality of divided stator cores.

Figure 4:
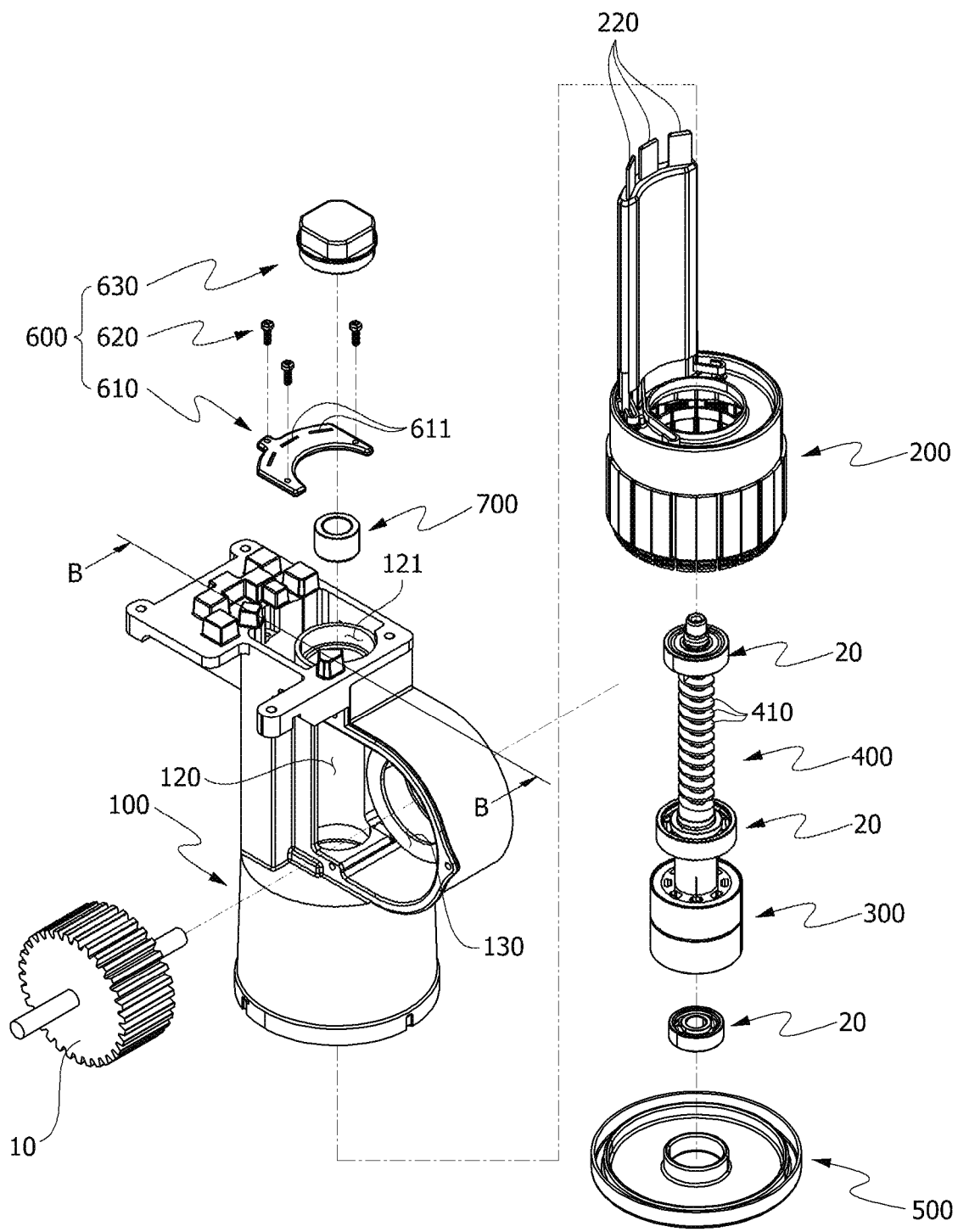
FIG. 4 is an exploded perspective view illustrating the motor according to the embodiment.
Figure 5:
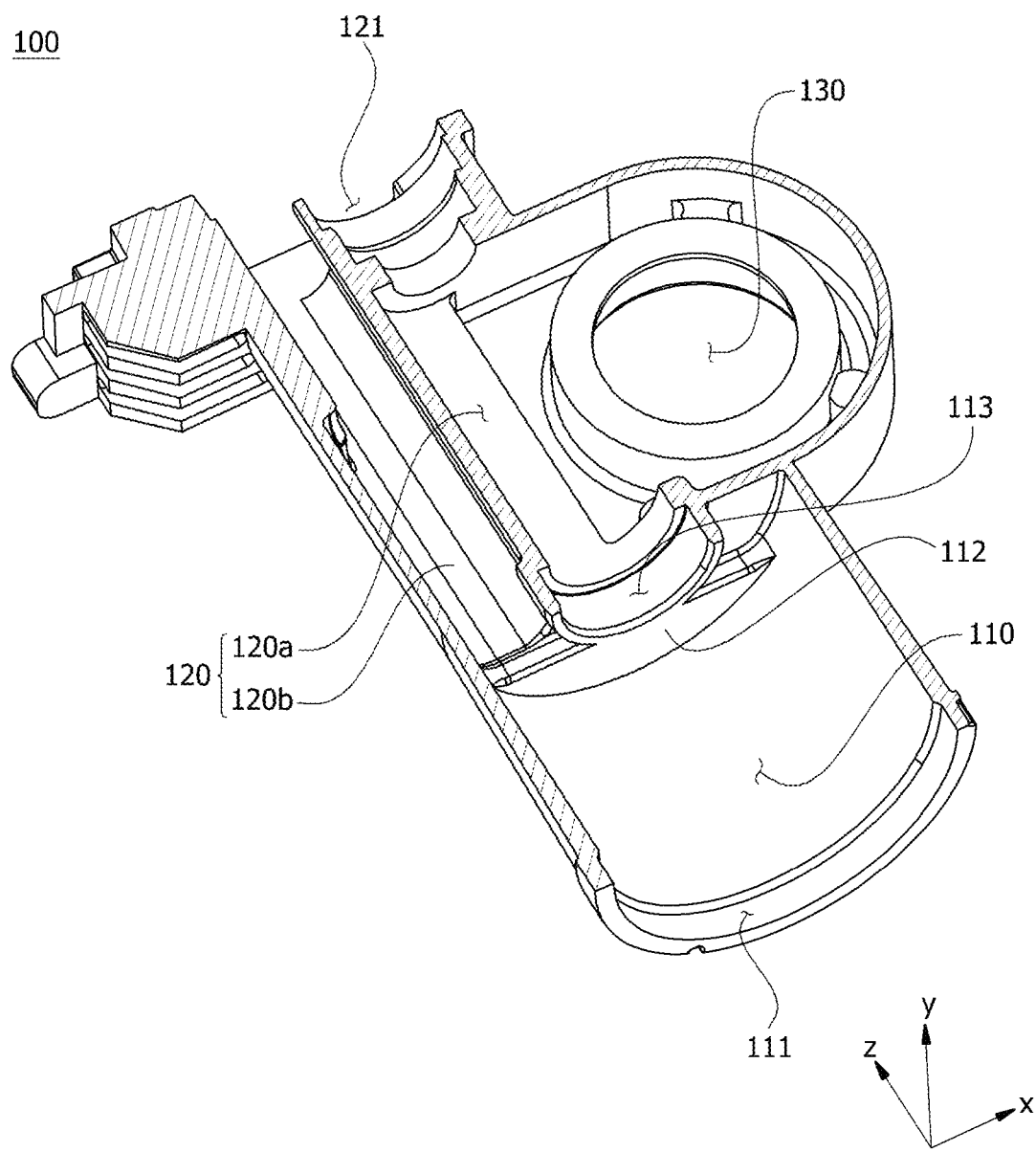
FIG. 5 is a view taken along line B-B of FIG. 4.
Figure 6:
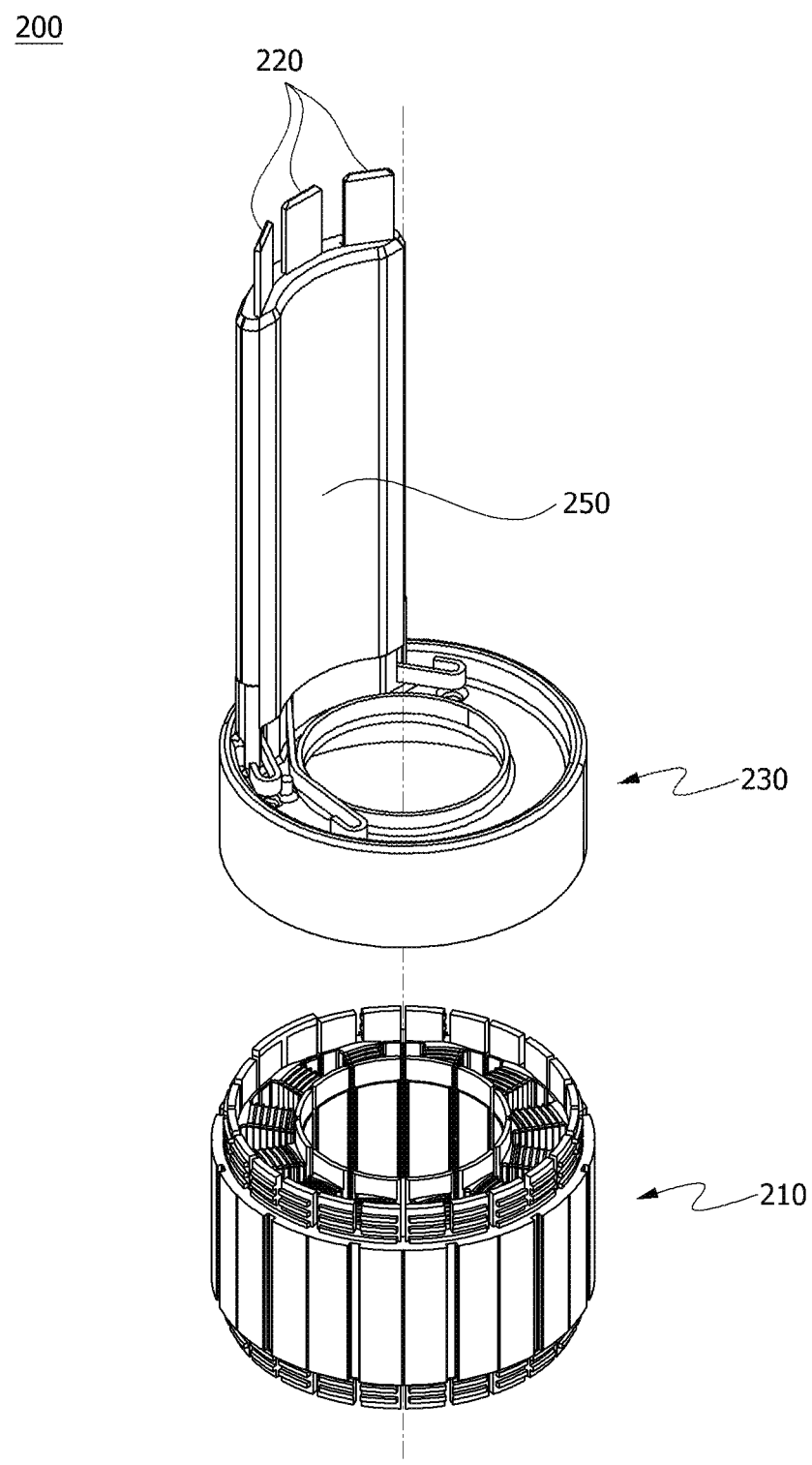
FIGS. 6 and 7 are views illustrating a stator of the motor according to the embodiment.
Figure 7:
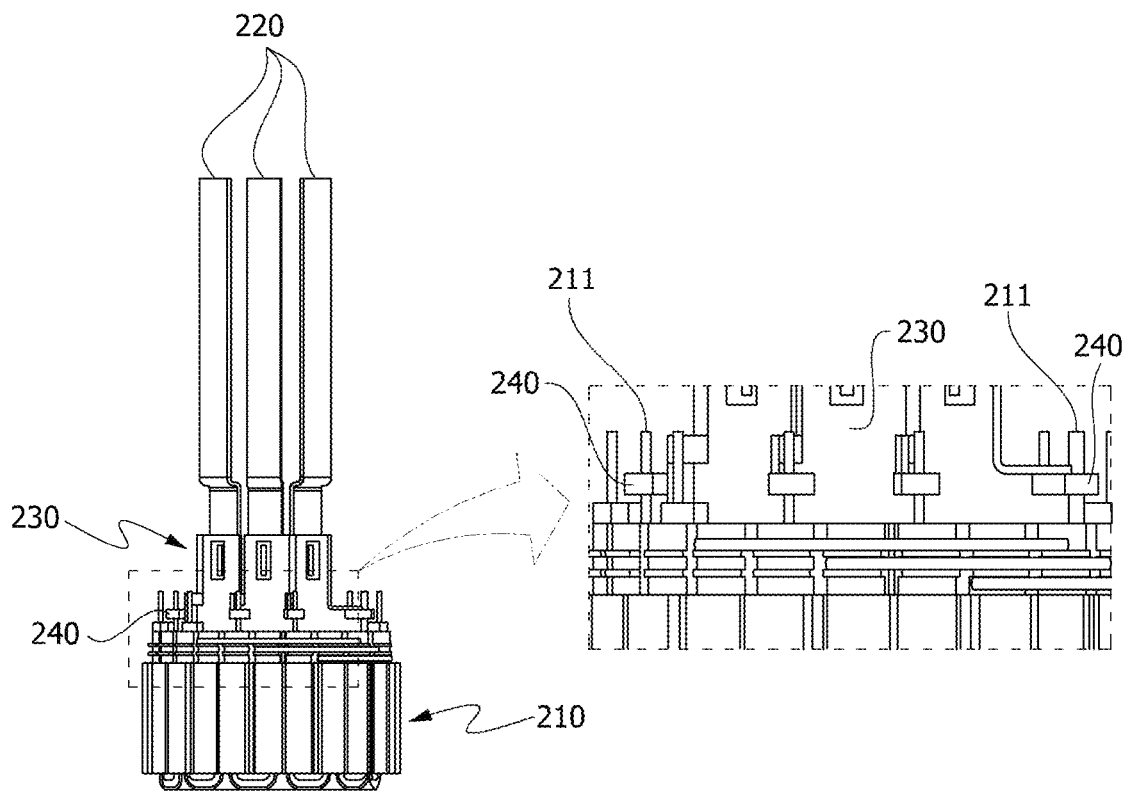

Referring to FIGS. 4, 6 and 7, the stator 200 may include a stator body 210 around which a coil is wound, the terminal 220 having a bar type, a bus bar 230, a conductive medium 240, and the terminal cover 250.

The stator body 210 may be formed such that a coil 211 is wound around the integrated stator core or the coil 211 is wound around the plurality of divided stator cores. In addition, as illustrated in FIG. 7, one end of the coil 211 may be disposed to be exposed at the outside in order to be electrically connected to the terminal 220.

The terminal 220 may be formed to extend in the bar type to be electrically connected to the stator body 210. Here, a length of the terminal 220 may correspond to that of the rotating shaft 400. In addition, one portion of the terminal 220 formed in the bar type may be bent to be coupled to the bus bar 230.

The bus bar 230 may be interposed between the stator body 210 and the terminal 220. Accordingly, the bus bar 230 may support one side of the terminal 220.

The conductive medium 240 may be interposed between one end of the coil 211 and the terminal 220. In addition, the conductive medium 240 electrically connects the coil 211 and the terminal 220. For example, the conductive medium 240 and the coil 211 or the conductive medium 240 and the terminal 220 may be electrically connected by a fusing method.

In addition, the conductive medium 240 may be formed to be flexible. For example, the conductive medium 240 may be formed as a stranded wire formed of a flexible material formed of copper or a copper alloy.

Accordingly, when a load is applied to the terminal 220, since the conductive medium 240 is formed of the flexible material and has flexibility, the load applied to the terminal 220 is dispersed or removed, and thus the connection made by the fusing method may not be released.

The terminal cover 250 may be disposed to cover the terminal 220 in order to protect the terminal 220. In addition, when the terminal 220 at which the terminal cover 250 is disposed is inserted into and installed in the terminal accommodation groove 120b, the terminal cover 250 may be guided by the terminal accommodation groove 120b.

The rotor 300 may include a rotor core having a cylindrical shape and a plurality of magnets attached to the rotor core. The rotor 300 may be rotated due to an electromagnetic interaction with the stator 200.

The rotating shaft 400 may be fixedly inserted into a center of the rotor 300 and rotated with the rotor 300. A thread 410 may be formed on the rotating shaft 400. In addition, since the thread 410 may be coupled to teeth of the gear 10, the rotating shaft 400 may be rotated in conjunction with the gear 10. That is, the gear 10 may be rotated according to the rotation of the rotating shaft 400.

Since a bearing 20 may be disposed on an outer circumferential surface of the rotating shaft 400, the rotating shaft 400 may rotate in the housing 100.

Here, the rotating shaft 400 may be formed in a long cylindrical shape. In addition, one side of the rotating shaft 400 may be supported by the sealing guide 600, and the other side thereof may be supported by the motor cover 500.

The motor cover 500 may be coupled to the opening 111 formed at the lower side of the housing 100. Accordingly, the first accommodation groove 110 in which the stator 200, the rotor 300, and the rotating shaft 400 are disposed may be sealed by the motor cover 500. Here, the motor cover 500 may be formed in a circular plate form.

The sealing guides 600 and 600a may inhibit grease introduced through the gear 10 from leaking to the outside through the rotating shaft 400 and may also support the terminal 220. The sealing guides 600 and 600a may be disposed to cover openings 121a and 121b formed at the upper side of the housing 100.

The sealing guides 600 and 600a may seal the opening 121a. In addition, the sealing guides 600 and 600a may support the terminal 220 exposed at the outside of the housing 100 through the opening 121b.

Since the sealing guides 600 and 600a have differences in being integrally formed and being fixed by additional fixing members, each of the sealing guides 600 and 600a will be described with reference to the accompanying drawings.

Figure 3:
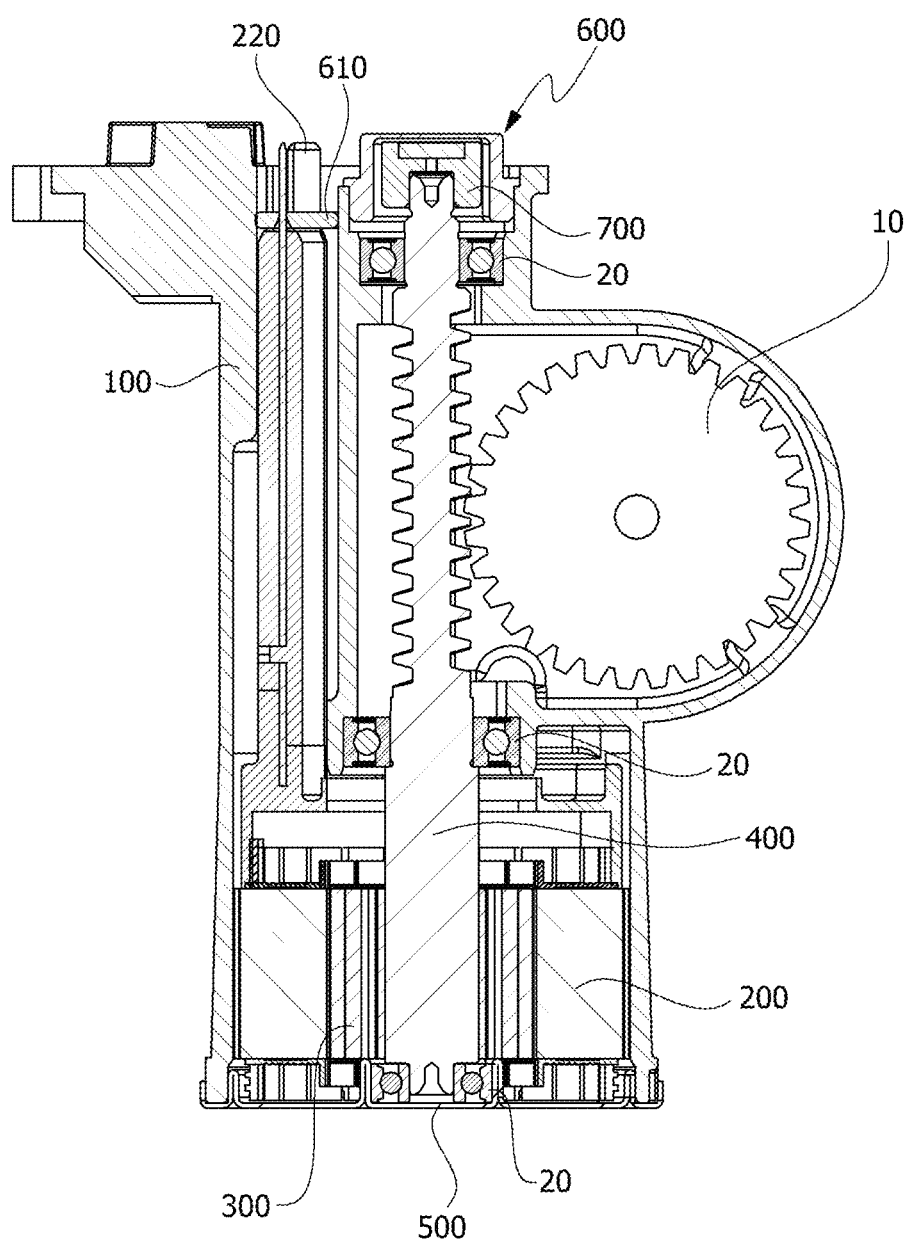
FIG. 3 is a cross-sectional view taken along line A-A of FIG. 2.

Referring to FIGS. 3 and 4, the sealing guide 600 according to the embodiment may include a grommet 610, fixing members 620, and a sealing cap 630. Here, the grommet 610 may be disposed to cover the opening 121b formed in an upper side of the terminal accommodation groove 120b.

As illustrated in FIG. 4, the grommet 610 may include through holes 611 formed such that the upper end of the terminal 220 passes through the through holes 611 and is coupled to the grommet 610. Here, the through holes 611 may be disposed in the grommet 610 in consideration of a width and a position of the terminal 220 to be disposed.

In addition, the grommet 610 may be fixed to one side of the housing 100 by the fixing members 620. Here, the fixing member 620 may use a volt, a screw, or the like.

Since one end of the terminal 220 formed to extend in the bar type may be supported by the grommet 610, the load applied to the terminal 220 by the grommet 610 may be applied only in a longitudinal direction of the terminal 220.

That is, since an end portion of the terminal 220 passes through and is coupled to the through holes 611, movement of the terminal 220 in X- axis and Y-axis directions may be inhibited. Accordingly, the load applied to the terminal 220 may be applied only in the longitudinal direction of the terminal 220 due to the grommet 610.

In addition, since the load applied to the terminal 220 in the longitudinal direction is dispersed or removed by the conductive medium 240, damage may be inhibited after fusing.

The upper end of the terminal 220 may be exposed at the outside of the housing 100 through the through hole 611 and coupled to a connector (not shown).

Accordingly, since the grommet 610 may inhibit a twist of the terminal 220 through the through hole 611, an assembly failure rate of the connector (not shown) connected to the terminal 220 may be minimized.

The sealing cap 630 may be disposed to cover the opening 121a formed at one side of the rotating shaft accommodation groove 120a.

The sealing cap 630 may inhibit grease introduced through the gear 10 from leaking to the outside along the rotating shaft 400 through the opening 121a. Here, the sealing cap 630 may be press-fitted at and installed in the opening 121a.

Figure 8:
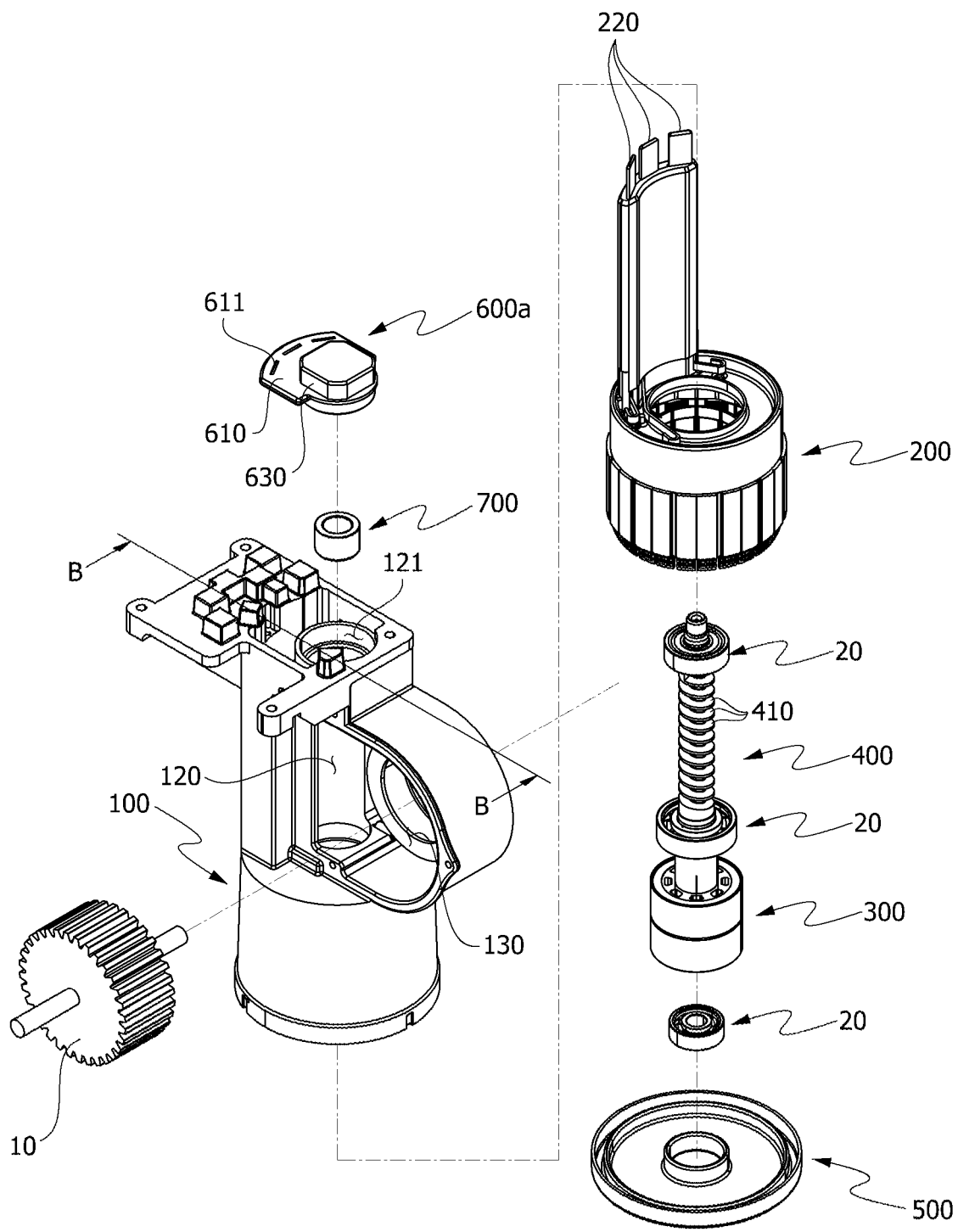
FIG. 8 is an exploded perspective view illustrating a sealing guide according to another embodiment.

Referring to FIG. 8, in the sealing guide 600a according to another embodiment, a grommet 610 and a sealing cap 630 may be integrally formed unlike the sealing guide 600. Here, the sealing guide 600a may be press-fitted at and installed in the opening 121a without a fixing member 620.

Accordingly, since the grommet 610 and the sealing cap 630 of the sealing guide 600a are integrally formed, the number of assembly processes may decrease.

The sensor magnet assembly 700 may be interposed between one end portion of the rotating shaft 400 and the sealing cap 630 of the sealing guide 600. The sensor magnet assembly 700 may detect rotation of the rotating shaft 400.

Figure 9:
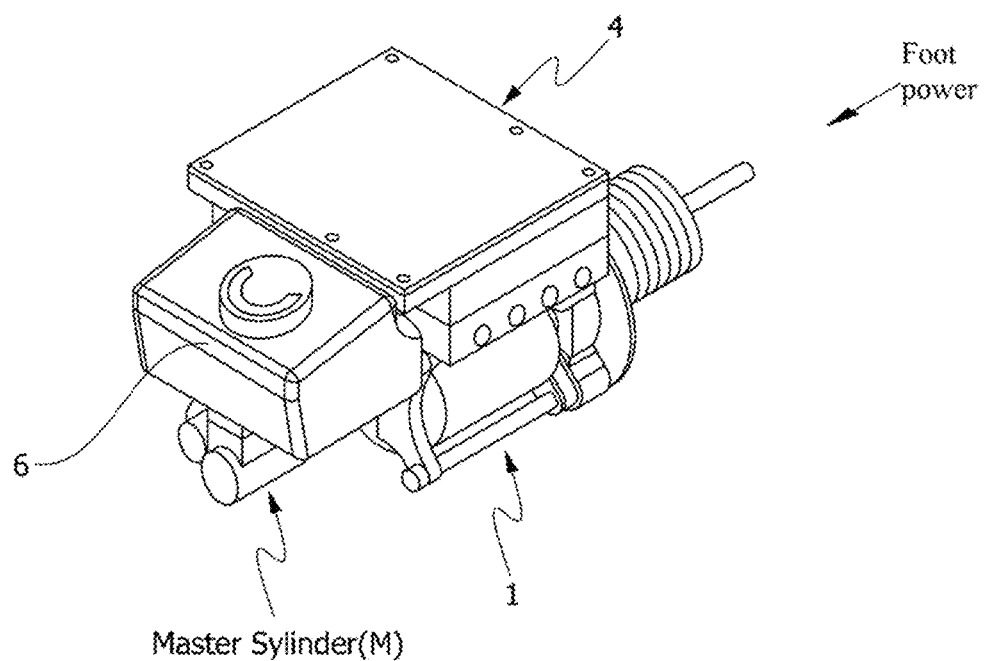
FIG. 9 is a view illustrating a brake device according to the embodiment.

Hereinafter, a brake device 1000 according to the embodiment will be described with reference to FIG. 9.

The brake device 1000 may include the motor 1, a master cylinder M, and an electronic stability control (ESC) system 4. Here, the master cylinder M may be operated by driving the motor 1.

Foot power is detected by the ESC system 4 of the brake device 1000, the motor 1 is operated by the ESC system 4 to increase the foot power, and a brake system is operated by pressing of the master cylinder M.

Accordingly, since the brake device 1000 may use the motor 1 instead of the conventional vacuum booster during braking of a vehicle, light-weight and improvement of fuel efficiency may be aimed. In addition, the brake device 1000 may perform braking without a vacuum pump.

Figure 10:
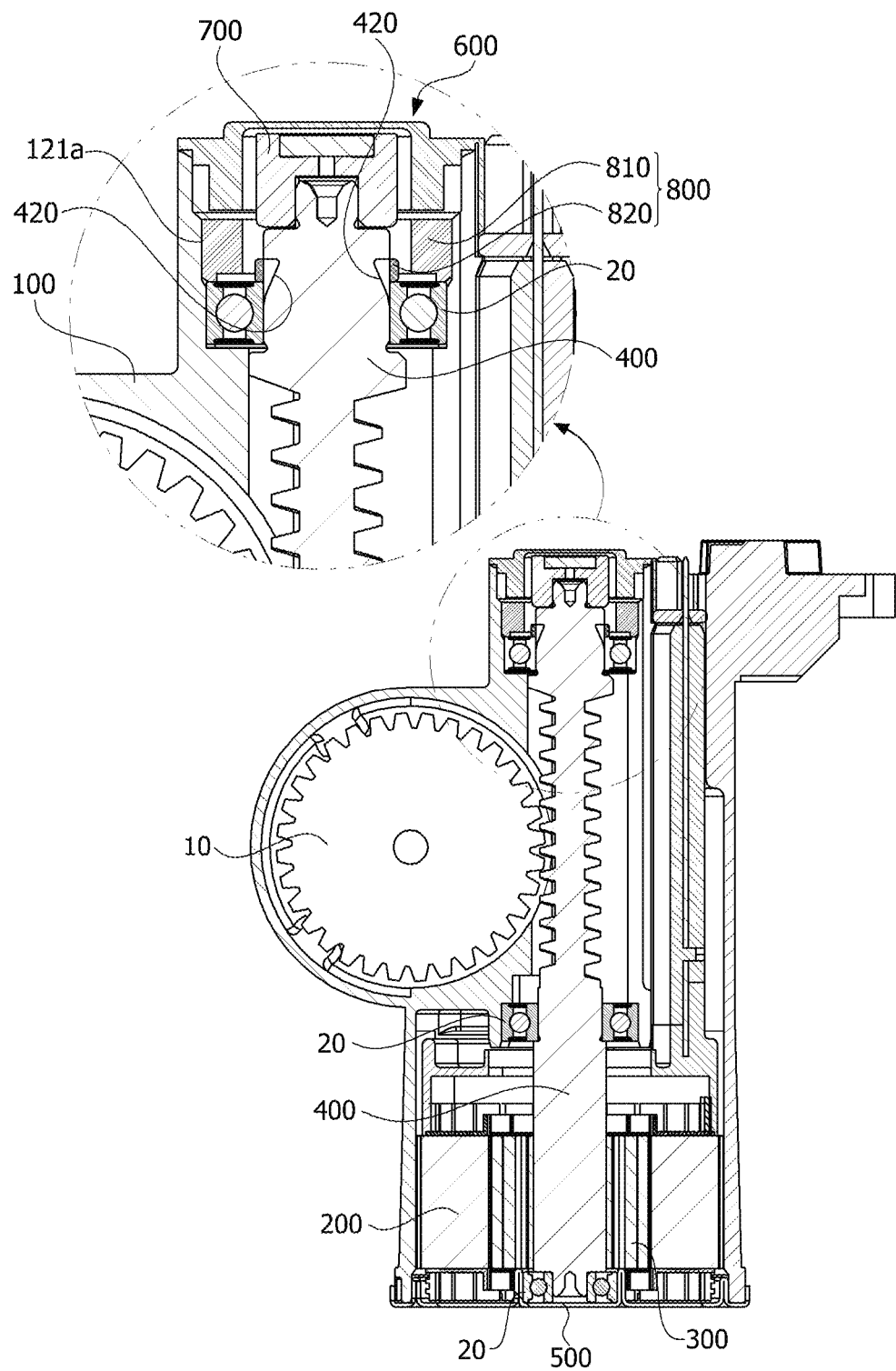
FIG. 10 is a view illustrating a bearing and a fixing member fixing the bearing.
Figure 11:
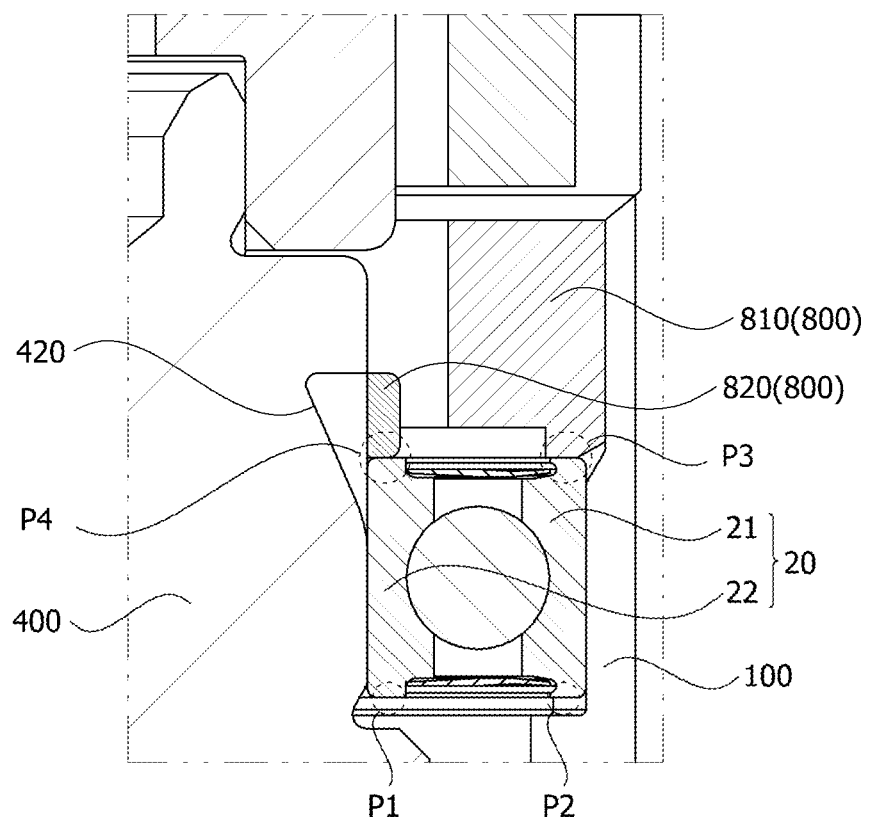
FIG. 11 is a view illustrating support points of the bearing.

FIG. 10 is a view illustrating a bearing and a fixing member fixing the bearing, and FIG. 11 is a view illustrating support points of the bearing.

Referring to FIGS. 10 and 11, the bearing 20 may be press-fitted and installed in the opening 121a of the housing 100. In addition, the bearing 20 may rotatably support the rotating shaft 400. Meanwhile, a fixing member 800 may be provided between the sealing guide 600 and the bearing 20 in a direction of the rotating shaft 400.

The fixing member 800 serves to inhibit separation of the bearing 20 in the direction of the rotating shaft.

The fixing member 800 may include a first fixing ring 810 and a second fixing ring 820.

The first fixing ring 810 is press-fitted at an inner wall of the opening 121a of the housing 100 and supports an upper surface of an outer wheel 21 of the bearing 20. An inner diameter of a part of the opening 121a in which the first fixing ring 810 is press-fitted may be formed to be greater than that of a part of the opening 121a in which the bearing 20 is press-fitted.

The second fixing ring 820 is located in the opening 121a of the housing 100 and press-fitted at the rotating shaft 400, and supports an upper surface of an inner wheel 22 of the bearing 20. A press-fitting groove 420 may be concavely formed in the rotating shaft 400 for press-fitting of the second fixing ring 820.

As illustrated in FIG. 11, since all four positions P1, P2, P3, and P4 of the bearing 20 are supported by the fixing member 800, an axial load of the motor may be firmly supported. Particularly, since the bearing 20 is engaged with the gear 10 (see FIG. 3) having a worm wheel structure, vibrations and a load may be highly applied to the bearing 20 in an axial direction of the rotating shaft, but the fixing member 800 may support the load in the axial direction and effectively inhibit separation of the bearing 20.

Figure 12:
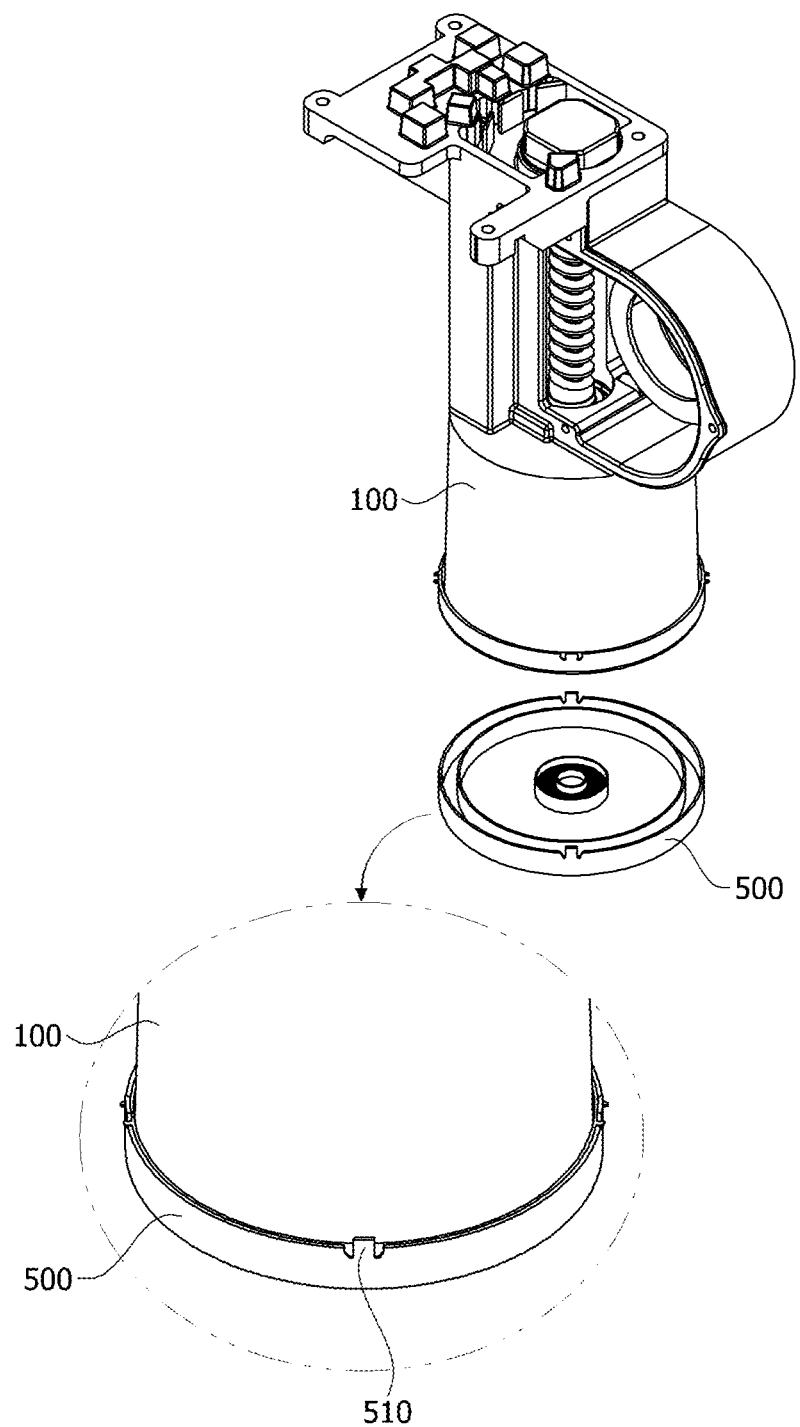
FIG. 12 is a view illustrating a first modified example of a coupling portion of a motor cover.
Figure 13:
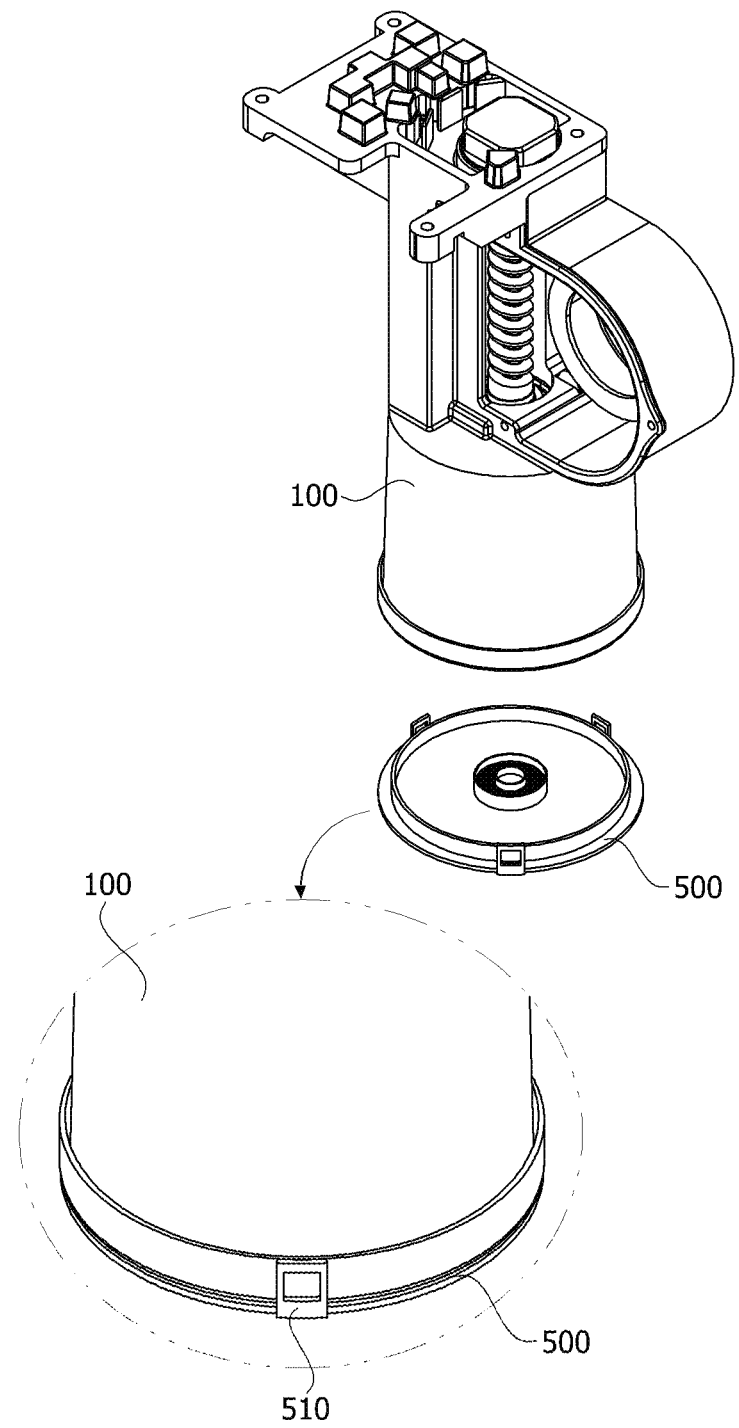
FIG. 13 is a view illustrating a second modified example of the coupling portion of the motor cover.

FIG. 12 is a view illustrating a first modified example of a coupling portion of the motor cover, and FIG. 13 is a view illustrating a second modified example of the coupling portion of the motor cover.

The motor cover 500 may be coupled to the opening 111 formed at the lower side of the housing 100. Here, the motor cover 500 may include a coupling portion 510 to be physically coupled to the housing 100.

Referring to FIG. 12, the coupling portion 510 according to the first modified example may be formed on an edge of the motor cover 500 and caulked in the housing 100.

Alternatively, referring to FIG. 13, the coupling portion 510 according to the second modified example may be formed at an edge of motor cover 500 and hook-coupled to the housing 100. An extension portion having a hook ring form may be formed on a circumference of the motor cover 500, and an extension having a hook protrusion form may be formed on a circumference of the housing 100 in order to correspond to the extension portion having the hook ring form.

While the present invention has been described with reference to the embodiments, it should be understood that various changes and modifications may be made thereto without departing from the spirit and the scope of the present invention defined by the appended claims. In addition, it should be interpreted that differences related to the changes and modifications are included in the scope of the present invention defined by the appended claims.

REFERENCE NUMERALS

| | |
|---|---|
| 1: MOTOR | 100: HOUSING |
| 200: STATOR | 300: ROTOR |
| 400: ROTATING SHAFT | 500: MOTOR COVER |
| 510: COUPLING PORTION | 600, 600a: SEALING GUIDE |
| 700: SENSOR MAGNET ASSEMBLY | |
| 800: FIXING MEMBER | 810: FIRST FIXING RING |
| 820: SECOND FIXING RING | 1000: BRAKE DEVICE |

The invention claimed is:

1. A motor comprising:
a rotating shaft;
a rotor including a hole in which the rotating shaft is disposed;
a stator disposed at an outer side of the rotor;
a housing configured to accommodate the rotor and the stator; and
a sealing guide disposed to cover an opening formed in one side of the housing,
wherein the sealing guide supports a terminal of the stator exposed at an outside of the housing,
wherein the housing includes a first accommodation groove in which the stator and the rotor are disposed and a second accommodation groove connected to the first accommodation groove, the first accommodation groove having a support surface in which a first through hole is formed;
wherein the second accommodation groove includes a rotating shaft accommodation groove in which the rotating shaft is disposed and a terminal accommodation groove in which the terminal is disposed,
wherein one end of the rotating shaft is inserted through the first accommodation groove to be disposed in the rotating shaft accommodation groove, and the terminal of the stator is inserted through the first accommodation groove to be disposed in the terminal accommodation groove,
wherein the rotating shaft accommodation groove and the terminal accommodation groove extend along a same direction,
wherein the rotating shaft accommodation groove and the terminal accommodation groove axially overlap the first accommodation groove with respect to an axis of the rotating shaft,
wherein the rotating shaft accommodation groove has a cross-sectional area in a shape of an arc of a first circle, the first accommodation groove has a cross-sectional area in a shape of a second circle, and a sum of a diameter of the cross-sectional area of the rotating shaft accommodation groove and a width of a cross-sectional area of the terminal accommodation groove is smaller than a diameter of the cross-sectional area of the first accommodation groove, and wherein an upper surface of the first accommodation groove, the support surface, and an upper surface of the first through hole form a first step structure and wherein the upper surface of the first through hole, a lateral surface of the rotating shaft accommodation groove, and an upper surface of the rotating shaft accommodation groove form a second step structure.

2. The motor of claim 1, wherein:
the sealing guide includes a grommet supporting an upper end of the terminal exposed at the outside and a sealing cap disposed to cover an opening formed in an upper side of the housing; and
the grommet is fixed to the housing by a fixing member.

3. The motor of claim 2, wherein the grommet includes a through hole formed such that the upper end of the terminal passes through the through hole and is coupled to the grommet.

4. The motor of claim 1, wherein the sealing guide includes a grommet for supporting an upper end of the terminal exposed at the outside and a sealing cap disposed to cover an opening formed in an upper side of the housing,
wherein the grommet and the sealing cap are integrally formed.

5. The motor of claim 4, wherein the grommet includes a through hole through which the upper end of the terminal passes.

6. The motor of claim 1, wherein the stator includes:
a stator body;
a terminal including an upper end disposed to be exposed at the outside of the housing;
a bus bar interposed between the stator body and the terminal; and
a conductive medium electrically connecting an end portion of a coil of the stator body and the terminal.

7. The motor of claim 6, wherein the conductive medium is formed to be flexible.

8. The motor of claim 6, wherein the terminal is formed in a bar type.

9. The motor of claim 1, wherein the housing includes a third accommodation groove connected to the second accommodation groove.

10. The motor of claim 9, wherein the rotating shaft accommodation groove guides the rotating shaft when the rotating shaft is received by the rotating shaft accommodation groove and moves in the rotating shaft accommodation groove.

11. The motor of claim 9, wherein:
the stator includes a terminal cover disposed to cover the terminal; and
the terminal accommodation groove guides the terminal at which the terminal cover is disposed when the terminal is received by the terminal accommodation groove and moves in the terminal accommodation groove.

12. The motor of claim 9, wherein the first accommodation groove and the third accommodation groove are disposed perpendicular to each other.

13. The motor of claim 9, comprising:
the first through hole configured to connect the first accommodation groove and the rotating shaft accommodation groove; and
a second through hole formed in a side surface of the third accommodation groove and configured to connect the second accommodation groove and the third accommodation groove.

14. The motor of claim 9, wherein a gear is disposed in the third accommodation groove.

15. The motor of claim 14, wherein the gear is coupled to a thread formed on the rotating shaft and is rotated by a rotation of the rotating shaft when the rotating shaft rotates.

16. The motor of claim 15, wherein a gear shaft of the gear and the rotating shaft are disposed to be perpendicular to and spaced apart from each other.

17. The motor of claim 9, wherein a sealing cap of the sealing guide is press-fitted and installed in an opening formed in an upper side of the rotating shaft accommodation groove.

18. The motor of claim 9, wherein a grommet of the sealing guide is disposed at an opening formed in an upper side of the terminal accommodation groove.

19. The motor of claim 1, comprising a bearing installed in the opening and configured to support the rotating shaft.

20. The motor of claim 19, comprising a fixing member installed in the opening, interposed between the sealing guide and the bearing, and configured to fix the bearing.

21. The motor of claim 20, wherein the fixing member includes a first fixing ring press-fitted at the opening and configured to be in contact with an upper surface of the bearing.

22. The motor of claim 21, wherein the fixing member includes a second fixing ring press-fitted at the shaft and configured to be in contact with the upper surface of the bearing.

23. The motor of claim 22, wherein:
the first fixing ring is in contact with an upper surface of an outer wheel of the bearing; and
the second fixing ring is in contact with an upper surface of an inner wheel of the bearing.

24. The motor of claim 1, comprising a motor cover disposed to cover an opening formed in an other side of the housing.

25. The motor of claim 24, wherein the motor cover includes a coupling portion formed at an edge of the motor cover and coupled to the housing.

26. A brake device comprising:
a motor;
a master cylinder operated by driving the motor; and
an electronic stability control (ESC) system,
wherein the motor includes a rotating shaft, a rotor including a hole in which the rotating shaft is disposed, a stator disposed at an outer side of the rotor, a housing configured to accommodate the rotor and the stator, and a sealing guide disposed to cover an opening formed in one side of the housing, and the sealing guide supports a terminal of the stator exposed at an outside of the housing,
wherein the housing includes a first accommodation groove in which the stator and the rotor are disposed and a second accommodation groove connected to the first accommodation groove, the first accommodation groove having a support surface in which a first through hole is formed;
wherein the second accommodation groove includes a rotating shaft accommodation groove in which the rotating shaft is disposed and a terminal accommodation groove in which the terminal is disposed,
wherein one end of the rotating shaft is inserted through the first accommodation groove to be disposed in the rotating shaft accommodation groove, and the terminal of the stator is inserted through the first accommodation groove to be disposed in the terminal accommodation groove, wherein the rotating shaft accommodation groove and the terminal accommodation groove extend along a same direction, wherein the rotating shaft accommodation groove and the terminal accommodation groove axially overlap the first accommodation groove with respect to an axis of the rotating shaft, and wherein the rotating shaft accommodation groove has a cross-sectional area in a shape of an arc of a first circle, the first accommodation groove has a cross-sectional area in a shape of a second circle, and a sum of a diameter of the cross-sectional area of the rotating shaft accommodation groove and a width of a cross-sectional area of the terminal accommodation groove is smaller than a diameter of the cross-sectional area of the first accommodation groove, and wherein an upper surface of the first accommodation groove, the support surface, and an upper surface of the first through hole form a first step structure and wherein the upper surface of the first through hole, a lateral surface of the rotating shaft accommodation groove, and an upper surface of the rotating shaft accommodation groove form a second step structure.

* * * * *